United States Patent
Drazynski et al.

(10) Patent No.: US 9,008,648 B2
(45) Date of Patent: Apr. 14, 2015

(54) AUTOMATED CONFIGURATION OF BASE STATIONS

(75) Inventors: Karol Drazynski, Wroclaw (PL); Jaroslaw Lachowski, Nowy Sacz (PL); Maciej Pakulski, Czernica (PL); Hanns Juergen Schwarzbauer, Gröbenzell (DE)

(73) Assignee: Nokia Solutions and Networks Oy, Espoo (FI)

( * ) Notice: Subject to any disclaimer, the term of this patent is extended or adjusted under 35 U.S.C. 154(b) by 79 days.

(21) Appl. No.: 13/825,335

(22) PCT Filed: Sep. 22, 2010

(86) PCT No.: PCT/EP2010/063947
§ 371 (c)(1),
(2), (4) Date: Jun. 17, 2013

(87) PCT Pub. No.: WO2012/037972
PCT Pub. Date: Mar. 29, 2012

(65) Prior Publication Data
US 2013/0281082 A1    Oct. 24, 2013

(51) Int. Cl.
*H04W 24/00* (2009.01)
*H04W 4/00* (2009.01)
*H04B 7/00* (2006.01)
*H04B 17/00* (2006.01)
*H04B 1/38* (2006.01)
*H04L 12/26* (2006.01)
*H04L 12/28* (2006.01)
*H04W 24/06* (2009.01)
(Continued)

(52) U.S. Cl.
CPC .............. *H04W 24/06* (2013.01); *H04W 24/02* (2013.01); *H04W 36/0083* (2013.01); *H04W 84/045* (2013.01)

(58) Field of Classification Search
CPC . H04W 36/0083; H04W 84/045; H04W 4/00; H04W 24/00; H04W 40/00; H04W 24/02; H04W 26/06; H04B 7/00; H04B 17/00; H04B 1/38; H04L 12/26; H04L 12/28
USPC ........... 455/422.1, 423, 448, 507, 67.11, 560, 455/561, 22.1; 370/252, 254
See application file for complete search history.

(56) References Cited

PUBLICATIONS

Soldani, David, et al., "Self-optimizing Neighbor Cell List for UTRA FDD Networks Using Detected Set Reporting", © 2007 IEEE, 5 pgs.
(Continued)

*Primary Examiner* — Inder Mehra
(74) *Attorney, Agent, or Firm* — Harrington & Smith (57) ABSTRACT

According to an apparatus, method and computer program product an interference pattern transmitted by a communication terminal based on a cellular communication network related configuration of the communication terminal is determined, wherein the determined interference pattern includes information on a transmission schedule of the communication terminal. Further, a wire connection based broadcast distribution of the determined interference pattern is initiated. Then, an interference pattern observed on a radio interface is compared with an interference pattern broadcast on wire connection, based on a transmission schedule of the interference pattern broadcast on wire connection. Finally, an originator of an interference pattern broadcast on wire connection is marked as a neighbor in case a match is determined between the interference pattern broadcast on wire connection of this originator and an interference pattern observed on a radio interface.

20 Claims, 4 Drawing Sheets (51) Int. Cl.
*H04W 24/02* (2009.01)
*H04W 36/00* (2009.01)
*H04W 84/04* (2009.01)

(56) References Cited

PUBLICATIONS

Amirijoo, Mehdi, et al., "Neighbor Cell Relation List and Physical Cell Identity Self-Organization in LTE", Ericsson Research, ICC 2008 workshop proceedings, 2008, 5 pgs.

3GPP TSG RAN WG3 #69bis meeting, Xi'An, China, Oct. 11-15, 2010, "Benefit of exchanging neighbor lists (NLs) between HNB and HNB-GW", Nokia Siemens Networks, Alcatel-Lucent, 4 pgs.

3GPP TSG-RAN WG3 #68, May 10-14, 2009, Montreal, Canada, "Analysis of supporting the X2 interface for HeNBs", Qualcomm Incorporated, 5 pgs.

3GPP TSG-SA5 (Telecom Management) Meeting SA 5#59bis, Jun. 16-18, 2008, Budapest, Hungary, S5-08xxxx(0946), "Conditions for addition and removal of neighbor relations by the ANR function", Qualcomm, 3 pgs.

3GPP TS 36.300 V10.0.0 (Jun. 2010), "$3^{rd}$ Generation Partnership Project; Technical Specification Group Radio Access Network; Evolved Universal Terrestrial Radio Access (E-UTRA) and Evolved Universal Terrestrial Radio Access Networ (E-UTRAN); Overall description; Stage 2 (Release 10)", 183 pgs.

3GPP TS 36.401 V9.2.0 (Jun. 2010), "$3^{rd}$ Generation Partnership Project; Technical specification Group Radio Access Network; Evolved Universal Terrestrial Radio Access Network (E-UTRAN)1 Architecture description (Release 9)", 19 pgs.

3GPP TS 36.420 V9.0.0 (Dec. 2009), "$3^{rd}$ Generation Partnership Project; Technical Specification Group Radio Access Network (E-UTRAN); X2 general aspects and principles (Release 9)", 12 pgs.

3GPP TS 36.423 V9.3,0 (Jun. 2010), "$3^{rd}$ Generation Partnership Project; Technical Specification Group Radio Access network; Evolved Universal Terrestrial Radio Access Network (E-UTRAN); X2 application protocol (X2AP) (Release 9)" 121 pgs.

AUTOMATED CONFIGURATION OF BASE STATIONS

FIELD OF THE INVENTION

The present invention relates to an apparatus, method, system and computer program product for the automated configuration of base stations. In particular, the present invention relates to an apparatus, method, system and computer program product for automated configuration of base stations such as Home evolved Node Bs of enterprise femtocells.

RELATED BACKGROUND ART

Prior art which is related to this technical field can e.g. be found by the technical specifications TS 36.300 (current version: 10.0.0), TS 36.401 (current version 9.2.0), TS 36.420 (current version 9.0.0), and TS 36.423 (current version: 9.3.0) of the 3GPP.

The following meanings for the abbreviations used in this specification apply:
3G: $3^{rd}$ Generation
3GPP: $3^{rd}$ Generation Partnership Project
ANR: Automatic Neighborhood Relation
AP: Application Protocol
CN: Core Network
CSG: Closed Subscriber Group
DL: Downlink
DSR: Detected Set Reporting
eNB: evolved Node B (eNode B)
HeNB: Home eNB
HII: High Interference Indication
HO: Hand-over
ID: Identifier
IOI: Interference Overload Indication
IP: Internet Protocol
IE: Information Element
LTE: Long Term Evolution
LTE-A: Long Term Evolution Advanced
MNO: Mobile Network Operator
NCL: Neighboring Cell List
NLM: Network Listening Mode
UE: User Equipment
UL: Uplink In the field of to LTE/LTE-A and femtocells the enterprise usage of HeNBs and in particular their auto-configuration like Automated Neighborhood Relation (ANR) has recently become the target of intense consideration. It is assumed that HeNBs in enterprises will generate a high portion of revenues related to the concept of femtocells. Hence, the 3GPP and the "Femtoforum" experience many activities towards enhancements in a dense femtocell deployment in an enterprise scenario.

However, one problem observed in enterprise femtocell deployment relates to cases of a massive femtocell roll-out where each base station has to have a configuration of Neighbouring Cell List (NCL) for HO purposes. Nowadays this is done manually and often tuned for better performance via e.g. drive-test over long and repetitive live network measurements and off-line processing. In this connection a rather high amount of tedious work, time and money is needed for proper NCL configuration in enterprise scenario especially taking into account the foreseen number of HeNBs to be deployed.

Hence, an automated, quick and reliable NCL population method is urgently needed.

A possible solution to NCL population in 3G is to enable Detected Set Reporting (DSR). As studies have shown (see "Neighbor Cell Relation List and Physical Cell Identity Self-Organization in LTE", M. Amirijoo, F. Gunnarsson, H. Kallin, J. Moe, K. Zetterberg, Ericsson Research, ICC 2008 workshop proceedings, 2008; and "Self-optimizing Neighbor Cell List for UTRA FDD Networks Using Detected Set Reporting", D. Soldani, I. Ore, Nokia Networks, IEEE, 2007), this has several drawbacks like e.g. initial high number of measurements to be taken, high signaling load due to frequent measurements, lower UE battery life and several failed HO attempts before the actual configuration final set-up. The same principles may apply to LTE ANR which may be time and resources consuming, taking into account that femto overlapping areas are quite small. Hence, users may relatively quickly and often move from one cell to another.

SUMMARY OF THE INVENTION

It is an object of the present invention to overcome at least some of the drawbacks of the prior art.

According to a first aspect of the present invention, this is accomplished by an apparatus, comprising interference determination means configured to determine an interference pattern transmitted by a communication terminal based on a cellular communication network related configuration of the communication terminal, wherein the determined interference pattern includes information on a transmission schedule of the communication terminal; interference pattern distribution means configured to initiate a wire connection based broadcast distribution of the determined interference pattern; interference pattern match means configured to compare an interference pattern observed on a radio interface with an interference pattern broadcast on wire connection, based on a transmission schedule of the interference pattern broadcast on wire connection; and neighbor listing means configured to mark as a neighbor an originator of an interference pattern broadcast on wire connection in case the interference pattern match means determines a match between the interference pattern broadcast on wire connection of this originator and an interference pattern observed on a radio interface.

Modifications of the first aspect may be as follows.

The apparatus according to the first aspect may be configured to be suitable for the automated configuration of base stations.

The interference pattern match means may be further configured to initiate sending acknowledgement of a match between an interference pattern observed on a radio interface and an interference pattern broadcast on wire connection to the originator thereof; and the neighbor listing means may be further configured to mark as a neighbor an originator of an acknowledgement of a match between an interference pattern observed on a radio interface and an interference pattern broadcast on wire connection.

The interference pattern distribution means may be further configured to initiate the wire connection based broadcast distribution of the determined interference pattern by including information on the determined interference pattern in a high interference indication information element; the interference pattern match means may be further configured to initiate sending acknowledgement on a match between an interference pattern observed on a radio interface and an interference pattern broadcast on wire connection to the originator thereof by including information on the match in an interference overload indication information element; and the neighbor listing means may be further configured to assess a physical distance in a communication network configuration to the originator of the acknowledgement of a match between an interference pattern observed on a radio interface and an interference pattern broadcast on wire connection based on an interference level indicated in the interference overload indication information element.

The apparatus may further comprise communication network detection means configured to detect communication network elements based on a wire connected internet protocol connection and to classify detected communication network elements according to an assessed physical distance in a communication network configuration based on a communication time evaluation, wherein the interference pattern distribution means may be further configured to initiate the wire connection based broadcast distribution of the determined interference pattern only with respect to a group of detected communication network elements which are classified to have a closest assessed physical distance.

The neighbor listing means may be further configured to inform a neighbor marking to the concerned neighbor or another neighbor, and to mark as a neighbor an originator of a neighbor marking information or another communication network element indicated in the neighbor marking information, based on the information content, as well as to acknowledge receipt of a neighbor marking information.

According to a second aspect of the present invention, the object is accomplished by an apparatus, comprising an interference determination processor configured to determine an interference pattern transmitted by a communication terminal based on a cellular communication network related configuration of the communication terminal, wherein the determined interference pattern includes information on a transmission schedule of the communication terminal; an interference pattern distributor configured to initiate a wire connection based broadcast distribution of the determined interference pattern; an interference pattern comparator configured to compare an interference pattern observed on a radio interface with an interference pattern broadcast on wire connection, based on a transmission schedule of the interference pattern broadcast on wire connection; and a neighbor listing control processor configured to mark as a neighbor an originator of an interference pattern broadcast on wire connection in case the interference pattern match means determines a match between the interference pattern broadcast on wire connection of this originator and an interference pattern observed on a radio interface.

Modifications of the second aspect of the present invention may correspond to the modifications of the first aspect.

According to a third aspect of the present invention, the object is accomplished by a Home evolved Node B, comprising an apparatus according to the first or second aspect of the present invention or any one of their modifications.

According to a fourth aspect of the present invention, the object is accomplished by a method, comprising determining an interference pattern transmitted by a communication terminal based on a cellular communication network related configuration of the communication terminal, wherein the determined interference pattern includes information on a transmission schedule of the communication terminal; initiating a wire connection based broadcast distribution of the determined interference pattern; comparing an interference pattern observed on a radio interface with an interference pattern broadcast on wire connection, based on a transmission schedule of the interference pattern broadcast on wire connection; and marking as a neighbor an originator of an interference pattern broadcast on wire connection in case a match is determined between the interference pattern broadcast on wire connection of this originator and an interference pattern observed on a radio interface.

Modifications of the fourth aspect may be as follows.

The method according to the fourth aspect may be configured to be suitable for the automated configuration of base stations.

The method may further comprise initiating sending acknowledgement of a match between an interference pattern observed on a radio interface and an interference pattern broadcast on wire connection to the originator thereof; and marking as a neighbor an originator of an acknowledgement of a match between an interference pattern observed on a radio interface and an interference pattern broadcast on wire connection.

The initiating the wire connection based broadcast distribution of the determined interference pattern may comprise including information on the determined interference pattern in a high interference indication information element, and the initiating sending acknowledgement on a match between an interference pattern observed on a radio interface and an interference pattern broadcast on wire connection to the originator thereof may comprise including information on the match in an interference overload indication information element, while the method may further comprise assessing a physical distance in a communication network configuration to the originator of the acknowledgement of a match between an interference pattern observed on a radio interface and an interference pattern broadcast on wire connection based on an interference level indicated in the interference overload indication information element.

The method may further comprise detecting communication network elements based on a wire connected internet protocol connection; and classifying detected communication network elements according to an assessed physical distance in a communication network configuration based on a communication time evaluation, wherein initiating the wire connection based broadcast distribution of the determined interference pattern may be performed only with respect to a group of detected communication network elements which are classified to have a closest assessed physical distance.

The method may further comprise informing a neighbor marking to the concerned neighbor or another neighbor; marking as a neighbor an originator of a neighbor marking information or another communication network element indicated in the neighbor marking information, based on the information content; and acknowledging receipt of a neighbor marking information.

The method according to the fourth aspect or any of its modifications may be performed by the apparatus according to the first or second aspect or suitable ones of their modifications.

According to a fifth aspect of the present invention, the object is accomplished by a computer program product comprising computer-executable components which perform, when the program is run on a computer, determining an interference pattern transmitted by a communication terminal based on a cellular communication network related configuration of the communication terminal, wherein the determined interference pattern includes information on a transmission schedule of the communication terminal; initiating a wire connection based broadcast distribution of the determined interference pattern; comparing an interference pattern observed on a radio interface with an interference pattern broadcast on wire convection, based on a transmission schedule of the interference pattern broadcast on wire connection; and marking as a neighbor an originator of an interference pattern broadcast on wire connection in case a match is determined between the interference pattern broadcast on wire connection of this originator and an interference pattern observed on a radio interface.

Modifications of the fifth aspect may be as follows.

The computer program product according to the fifth aspect may be suitable for the automated configuration of base stations.

The computer program product according to the fifth aspect may be embodied as a computer-readable storage medium.

Otherwise, modifications of the fifth aspect may correspond to the modifications of the fourth aspect.

It is to be understood that any of the above modifications can be applied singly or in combination to the respective aspects to which they refer, unless they are explicitly stated as excluding alternatives.

BRIEF DESCRIPTION OF THE DRAWINGS

The above and other objects, features, details and advantages will become more fully apparent from the following detailed description of the preferred embodiments which is to be taken in conjunction with the appended drawings, in which.

DETAILED DESCRIPTION OF THE PREFERRED EMBODIMENTS

In the following, description is made to what are presently considered to be preferred embodiments of the present invention. It is to be understood, however, that the description is given by way of example only, and that the described embodiments are by no means to be understood as limiting the present invention thereto.

For example, for illustration purposes, in some of the following exemplary embodiments, automated configuration of base stations such as e.g. based on LTE-Advanced is described. However, it should be appreciated that these exemplary embodiments are not limited for use among these particular types of wireless communication systems, and according to further exemplary embodiments, the present invention can be applied also to other types of communication systems and access networks in which the problem of automated configuration of base stations occurs.

Thus, certain embodiments of the present invention relate to mobile wireless communication systems, such as 3GPP LTE and 3GPP LTE-Advanced. In more detail, certain embodiments of the present invention are related to the configuration of an LTE eNB/HeNB and components thereof, or the like.

However, as indicated above, the present invention is not limited to eNB/HeNB, but other embodiments of the present invention are related to general base station nodes and components thereof.

Figure 1:
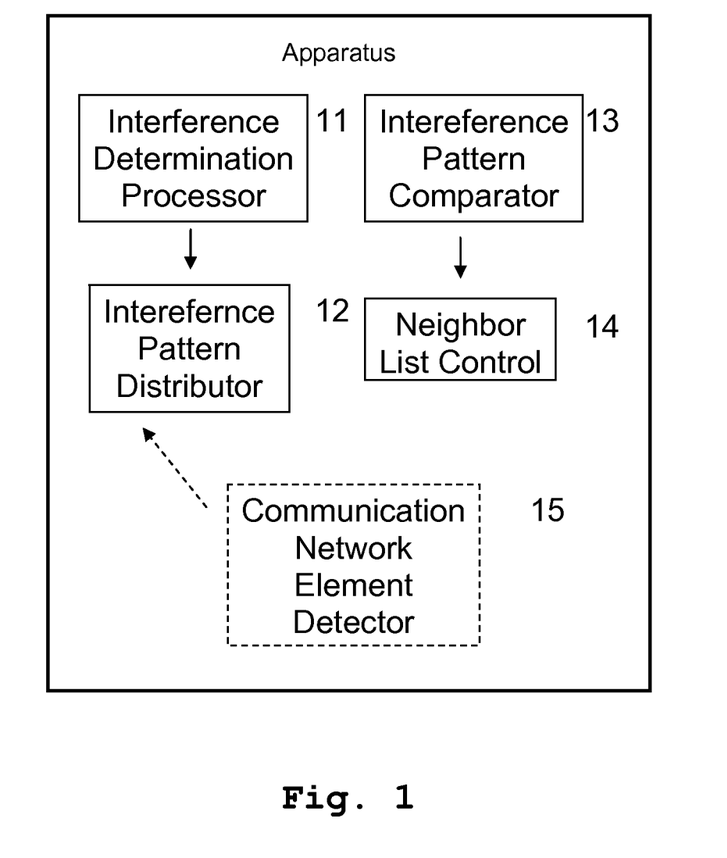
FIG. 1 shows an apparatus according to certain embodiments of the present invention.

FIG. 1 shows a principle configuration of an example for an apparatus according to certain embodiments of the present invention. One option for implementing this example for an apparatus according to certain embodiments of the present invention would be a component in a Home evolved Node B according to LTE.

Specifically, as shown in FIG. 1, the example for an apparatus comprises an interference determination processor 11 configured to determine an interference pattern transmitted by a communication terminal based on a cellular communication network related configuration of the communication terminal, wherein the determined interference pattern includes information on a transmission schedule of the communication terminal. Further, the example apparatus comprises an interference pattern distributor 12 configured to initiate a wire connection based broadcast distribution of the determined interference pattern. In addition, the example apparatus comprises an interference pattern comparator 13 configured to compare an interference pattern observed on a radio interface with an interference pattern broadcast on wire connection, based on a transmission schedule of the interference pattern broadcast on wire connection, and a neighbor listing control processor 14 configured to mark as a neighbor an originator of an interference pattern broadcast on wire connection in case the interference pattern comparator 13 determines a match between the interference pattern broadcast on wire connection of this originator and an interference pattern observed on a radio interface.

Moreover, in FIG. 1 is indicated an example of an advantageous modification, wherein the example apparatus additionally comprises a communication network element detector 15 configured to detect communication network elements based on a wire connected internet protocol connection and to classify detected communication network elements according to an assessed physical distance in a communication network configuration based on a communication time evaluation. In this case, the interference pattern distributor 12 is further configured to initiate the wire connection based broadcast distribution of the determined interference pattern only with respect to a group of detected communication network elements which are classified to have a closest assessed physical distance.

Figure 2:
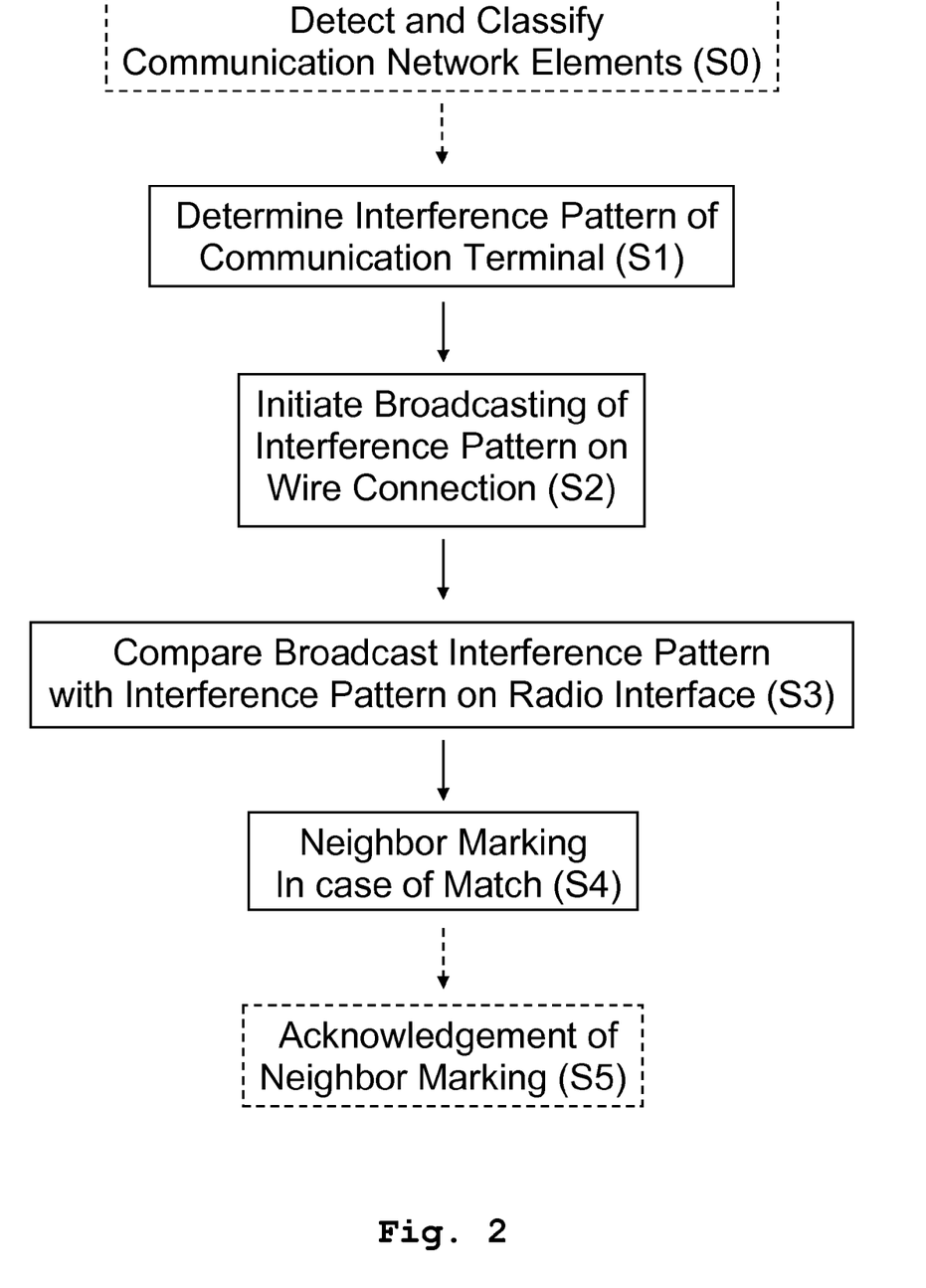
FIG. 2 shows a flow chart illustrating a method according to certain embodiments of the present invention.

FIG. 2 shows a principle flowchart of an example for a method according to certain embodiments of the present invention. That is, as shown in FIG. 2, this method comprises determining (S1) an interference pattern transmitted by a communication terminal based on a cellular communication network related configuration of the communication terminal, wherein the determined interference pattern includes information on a transmission schedule of the communication terminal; initiating (S2) a wire connection based broadcast distribution of the determined interference pattern; comparing (S3) an interference pattern observed on a radio interface with an interference pattern broadcast on wire connection, based on a transmission schedule of the interference pattern broadcast on wire connection; and marking (S4) as a neighbor an originator of an interference pattern broadcast on wire connection in case a match is determined between the interference pattern broadcast on wire connection of this originator and an interference pattern observed on a radio interface.

As further shown in FIG. 2, example modifications would be e.g. prior to the above steps of the example method, detecting (S0) communication network elements based on a wire connected internet protocol connection, and classifying (S0) detected communication network elements according to an assessed physical distance in a communication network configuration based on a communication time evaluation. In this case, the initiating (S2) the wire connection based broadcast distribution of the determined interference pattern is performed only with respect to a group of detected communication network elements which are classified to have a closest assessed physical distance. Another example modification concerns an acknowledgment (S5) of neighbor marking after the step of marking (S4) as a neighbor.

One option for performing the example of a method according to certain embodiments of the present invention would be to use the apparatus as described above or a modification thereof which becomes apparent from the embodiments as described herein below.

According to certain embodiments of the present invention, a new method of NCL configuration is presented which takes advantage of the fact that the HeNBs in enterprise scenario are located close to each other, and are interconnected over a same IP sub-network. This method is further based on an interconnection of the HeNBs which for example could be by using the X2 interface. However, this is not mandatory. Additionally, the instant method according to certain embodiments of the present invention could be also used to set-up the direct X2 connection between the HeNBs in the first place, assuming that the HeNBs have knowledge about the transport layer (TNL) address to be used when setting up the direct X2 connection. This knowledge could either be provided by configuration or acquired more dynamically by exploiting the fact that in enterprise deployments the HeNBs could detect each other using appropriate IP messaging.

According to certain embodiments of the present invention, the instant method comprises the following steps:

In a first step, the HeNBs may learn using e.g. IP protocol about the presence of others HeNBs in the same enterprise IP sub-network. Based thereon, the HeNBs can build-up an IP HeNB neighbors table, where HeNBs could be classified by e.g. the amount of time needed for a ping request to be sent and received or the amount of hops to reach a distant HeNB. The HeNBs shall memorize this information for the usage in subsequent states.

Though, the HeNBs may not be able to estimate based on the IP measurements mentioned above their adjacent neighbors. However, a UE terminal can be used to narrow down the area of search. For this purpose, once a permitted (i.e. allowed to use the enterprise CSG ID) terminal establishes connection with a HeNB, this cell shall broadcast over the X2-AP interface the High Interference Indication (HII) IE with a special information telling the recipients of this message to listen on their radio interface for a interference pattern matching the HII IE. Since the HII IE contains information about scheduling of the connected UE, other cells can match the interference observed and received within this IE. In case they match, the receiving cell shall memorize the HII IE originating cell as a possible direct neighbor.

All cells where the above described interference observed on the radio interface and the interference described in the HII IE matched shall respond with an Interference Overload Indication (IOI) IE with additional information indicating the match of received interferences. Based thereon, the receiving HeNB shall store the responding HeNB as direct neighbors. In addition, based on the interference level indicated within the IOI IE, the receiving HeNB is able to assess which sending parties are most probably closer and which farther away. This information can be used for optimizing the NCL.

Finally, a mutual exchange of information confirming the addition on cells to the NCLs is conducted.

In the following, further certain embodiments of the present invention are described with respect to FIGS. 3 to 6 which demonstrate either alternative features or further detail features with respect to the above description.

At the beginning of the HeNB deployment it is assumed that the NCL are empty except neighbors that are discovered in Network Listening Mode (NLM), i.e. overlaying macro cells and neighboring HeNBs which are close enough to be mutually heard.

The HeNBs can discover all other HeNBs in the same sub-network over IP. The HeNBs could be classified e.g. by using the same CSG ID.

Figure 3:
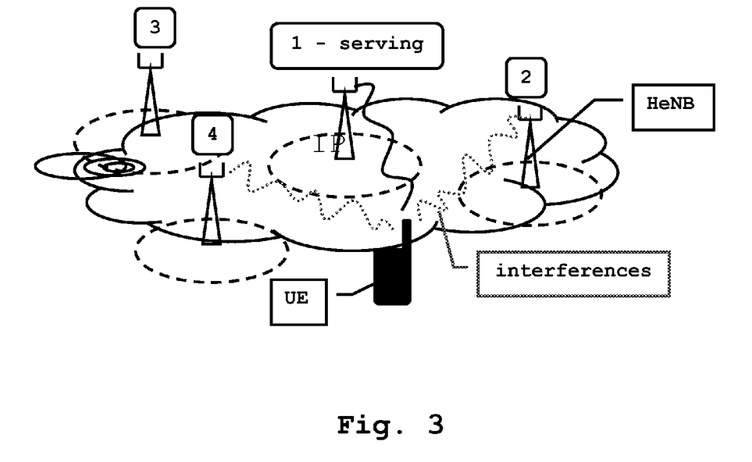
FIG. 3 shows an interference situation caused by a permitted UE when connecting with a CSG cell according to certain embodiments of the present invention.

As depicted in FIG. 3, a permitted UE connects with a CSG cell of the enterprise (see FIG. 3, cell #1—serving cell). This connection causes interferences to other HeNBs (i.e. #2 and #4), since those cells are in direct vicinity to each other.

Figure 4:
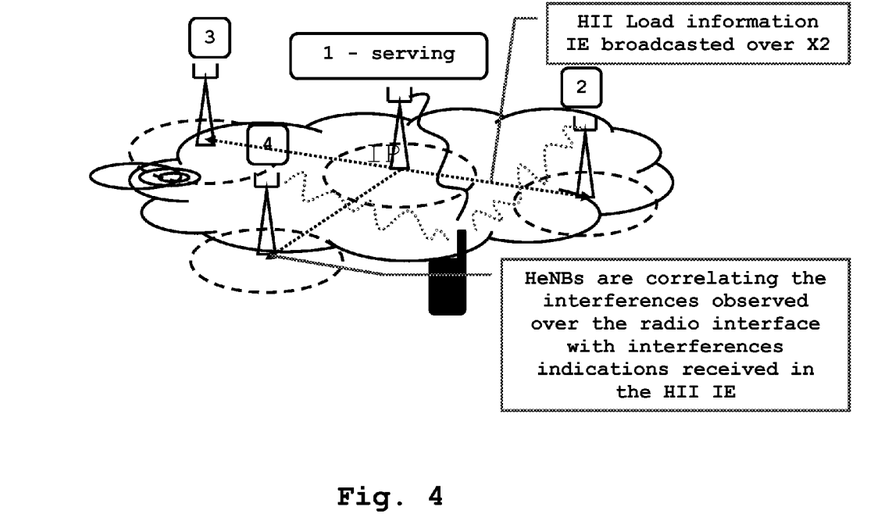
FIG. 4 shows a correlation of interference occurrence patterns according to certain embodiments of the present invention.

As illustrated in FIG. 4, the serving HeNB (#1) is scheduling the UE accordingly, and sends load information using the X2-AP interface with the IE High Interference Indication (HII). According to certain embodiments of the present invention, however, this message is extended to indicate that its purpose in this case is to discover cell neighbors. Based on this information the interferences receiving party can correlate the interferences occurrence pattern with the scheduling pattern received in the HII IE. If those interferences match, then they must come from the same UE. Hence, those cells must be close to each other.

Figure 5:
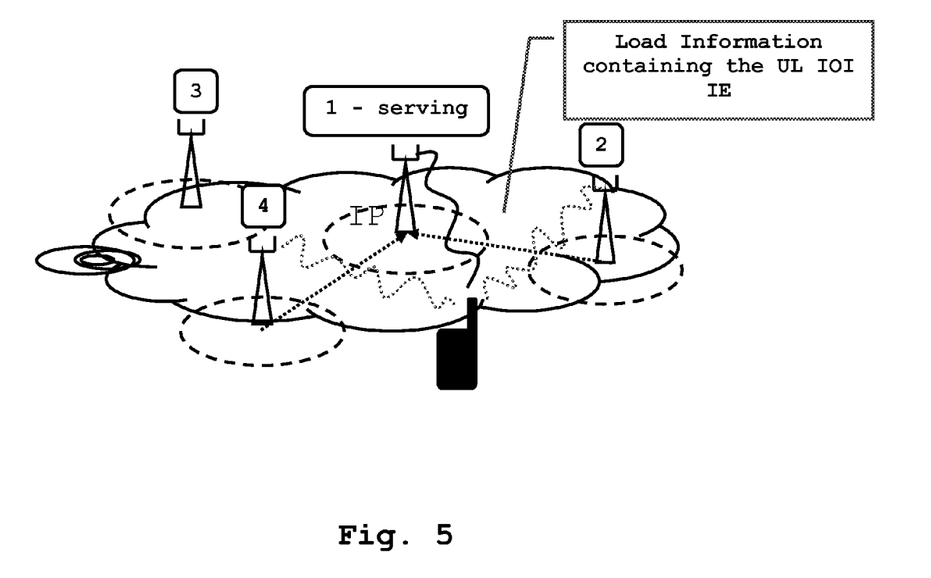
FIG. 5 shows a further step in the correlation of interference occurrence patterns according to certain embodiments of the present invention.

FIG. 5 shows that the nodes receiving interferences over the radio interface (i.e. #2 and #4), after identifying as described above that they may be close to node #1, can answer with UL Interference Overload Indication (IOI) IE, which, according to certain embodiments of the present invention, can be modified according to needs. This IE contains the level of observed interferences. Hence, based thereon the receiving HeNB (#1) can estimate which HeNB might be closer or farther away. Other HeNBs which did not see interferences or where the interferences occurrence pattern did not match with the scheduling pattern received in HII IE are not responding with the IOI IE (like HeNB #3 of FIG. 5).

Figure 6:
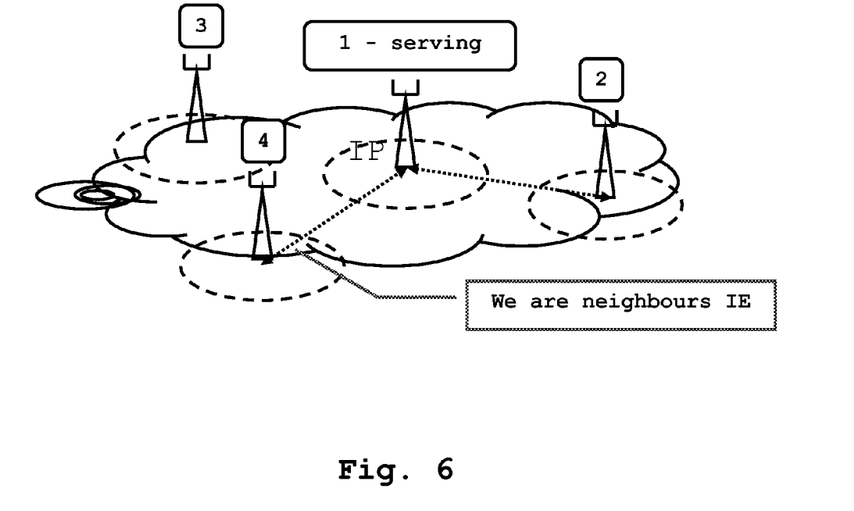
FIG. 6 shows mutual information exchange for acknowledging neighborship according to certain embodiments of the present invention.

Based thereon, and as indicated in FIG. 6, the HeNBs exchange mutual information in order to add their neighbors to their NCL, (i.e. for example HeNB #1 adds HeNB #2 and #4 to his NCL, HeNB #4 adds HeNB #2, and HeNB #2 adds HeNB #4 to his NCL) a new IE is exchanged to command HeNB #2 and #4 to add HeNB #1 to NCL, and the neighbors are acknowledged based on a new information element.

A great advantage of the above described certain embodiments of the present invention is the potential speed of the solution and the minimization of signaling. Since a femtocell roll-out and deployment in enterprise environment should be quick and represent an automated process without exhausting configuration processes, this solution helps to mitigate the process of automated neighbor list configuration. The method according to the above described certain embodiments of the present invention enables to configure neighbors quicker and without additional, time and battery life consuming, measurements done by UEs. This can be highly important in an environment where base station coverage overlapping areas are quite small, and which may thus result in many failed HOs. What can be also important is that, since X2 signaling can be used for the discovery process, the signaling required by this process is fully hidden from the Mobile Network Operator (MNO) network, thus minimizing the Core Network (CN) signaling load. Accordingly, the above described certain embodiments of the present invention represent a valuable add-on to ANR neighbor discovery processes in LTE/LTE-A for enterprise environments.

According to further certain embodiments of the present invention the above described methods and related implementations in HeNBs could be used as an enterprise extension to existing ANR process e.g. according to 3GPP TS 36.300 with potential additional changes to specifications describing X2 messages (e.g. 3GPP TS 36.423) and HeNBs behavior upon reception of this new message.

As indicated above, implementation examples for certain embodiments of the present invention include base station equipment capable of automated configuration such as LTE/LTE-Advanced HeNB, but are not limited thereto.

According to the above description, it should thus be apparent that exemplary embodiments of the present invention provide, for example from the perspective of a network element such as an evolved Node B (eNB)/Home evolved Node B (HeNB) or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of automated configuration of a base station.

Implementations of any of the above described blocks, apparatuses, systems, techniques or methods include, as non limiting examples, implementations as hardware, software, for example in connection with a digital signal processor, firmware, special purpose circuits or logic, general purpose hardware or controller or other computing devices, or some combination thereof.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
   interference determination means configured to determine an interference pattern transmitted by a communication terminal based on a cellular communication network related configuration of the communication terminal, wherein the determined interference pattern includes information on a transmission schedule of the communication terminal;
   interference pattern distribution means configured to initiate using an interface between base stations a broadcast distribution of the determined interference pattern;
   interference pattern match means configured to compare an interference pattern observed on a radio interface with an interference pattern broadcast on the interface between base stations, based on a transmission schedule of the interference pattern broadcast on the interface between base stations; and
   neighbor listing means configured to mark as a neighbor an originator of an interference pattern broadcast on the interface between base stations in case a match is determined between the interference pattern broadcast on the interface between base stations of this originator and an interference pattern observed on a radio interface.

2. The apparatus according to claim 1, wherein:
   the interference pattern match means is further configured to initiate sending acknowledgement of a match between an interference pattern observed on a radio interface and an interference pattern broadcast on the interface between base stations to the originator thereof; and
   the neighbor listing means is further configured to mark as a neighbor an originator of an acknowledgement of a match between an interference pattern observed on a radio interface and an interference pattern broadcast on the interface between base stations.

3. The apparatus according to claim 2, wherein:
   the interference pattern distribution means is further configured to initiate the broadcast distribution of the determined interference pattern by including information on the determined interference pattern in a high interference indication information element;
   the interference pattern match means is further configured to initiate sending acknowledgement on a match between an interference pattern observed on a radio interface and an interference pattern broadcast on the interface between base stations to the originator thereof by including information on the match in an interference overload indication information element; and
   the neighbor listing means is further configured to assess a physical distance in a communication network configuration to the originator of the acknowledgement of a match between an interference pattern observed on a radio interface and an interference pattern broadcast on the interface between base stations based on an interference level indicated in the interference overload indication information element.

4. The apparatus according to claim 1, further comprising:
   communication network detection means configured to detect communication network elements based on a internet protocol connection using the interface between base stations and to classify detected communication network elements according to an assessed physical distance in a communication network configuration based on a communication time evaluation, wherein the interference pattern distribution means is further configured to initiate using the interface between base stations the broadcast distribution of the determined interference pattern only with respect to a group of detected communication network elements which are classified to have a closest assessed physical distance.

5. The apparatus according to claim 1, wherein:
   the neighbor listing means is further configured to inform a neighbor marking to the concerned neighbor or another neighbor, and to mark as a neighbor an originator of a neighbor marking information or another communication network element indicated in the neighbor marking information, as well as acknowledging receipt of a neighbor marking information.

6. A Home evolved Node B, comprising:
   an apparatus according to claim 1.

7. The apparatus according to claim 1, wherein the interface between bases stations uses a wire connection.

8. A method, comprising:
   determining an interference pattern transmitted by a communication terminal based on a cellular communication network related configuration of the communication terminal, wherein the determined interference pattern includes information on a transmission schedule of the communication terminal;
   initiating using an interface between base stations a broadcast distribution of the determined interference pattern;
   comparing an interference pattern observed on a radio interface with an interference pattern broadcast on the interface between base stations, based on a transmission schedule of the interference pattern broadcast on the interface between base stations; and marking as a neighbor an originator of an interference pattern broadcast on the interface between base stations in case a match is determined between the interference pattern broadcast on the interface between base stations of this originator and an interference pattern observed on a radio interface.

9. The method according to claim 8, further comprising:

initiating sending acknowledgement of a match between an interference pattern observed on a radio interface and an interference pattern broadcast on the interface between base stations to the originator thereof; and marking as a neighbor an originator of an acknowledgement of a match between an interference pattern observed on a radio interface and an interference pattern broadcast on the interface between base stations.

10. The method according to claim 9, wherein:

initiating using the interface between base stations the broadcast distribution of the determined interference pattern comprises including information on the determined interference pattern in a high interference indication information element, and initiating sending acknowledgement on a match between an interference pattern observed on a radio interface and an interference pattern broadcast on the interface between base stations to the originator thereof comprises including information on the match in an interference overload indication information element; the method further comprising:

assessing a physical distance in a communication network configuration to the originator of the acknowledgement of a match between an interference pattern observed on a radio interface and an interference pattern broadcast on the interface between base stations based on an interference level indicated in the interference overload indication information element.

11. The method according to claim 8, further comprising:

detecting communication network elements based on an internet protocol connection using the interface between base stations; and classifying detected communication network elements according to an assessed physical distance in a communication network configuration based on a communication time evaluation, wherein initiating using the interface between base stations the based broadcast distribution of the determined interference pattern is performed only with respect to a group of detected communication network elements which are classified to have a closest assessed physical distance.

12. The method according to claim 8, further comprising:

informing a neighbor marking to the concerned neighbor or another neighbor;

marking as a neighbor an originator of a neighbor marking information or another communication network element indicated in the neighbor marking information; and acknowledging receipt of a neighbor marking information.

13. The method according to claim 8, wherein the interface between base stations uses a wire connection.

14. A computer program product comprising a non-transitory computer-readable medium comprising computer-executable components which perform the method of claim 8, when the computer-executable components are run on a computer.

15. The computer program product according to claim 14, wherein the interface between base stations uses a wire connection.

16. An apparatus, comprising:

at least one processor; and at least one memory including computer program code, the at least one memory and the computer program code configured to, with the at least one processor, cause the apparatus to perform at least the following:

determine an interference pattern transmitted by a communication terminal based on a cellular communication network related configuration of the communication terminal, wherein the determined interference pattern includes information on a transmission schedule of the communication terminal;

initiate using an interface between base stations a broadcast distribution of the determined interference pattern;

compare an interference pattern observed on a radio interface with an interference pattern broadcast on the interface between base stations, based on a transmission schedule of the interference pattern broadcast on the interface between base stations; and mark as a neighbor an originator of an interference pattern broadcast on the interface between base stations in case a match is determined between the interference pattern broadcast on the interface between base stations of this originator and an interference pattern observed on a radio interface.

17. The apparatus according to claim 16, wherein:

comparing an interference pattern further comprises initiating sending acknowledgement of a match between an interference pattern observed on a radio interface and an interference pattern broadcast on the interface between base stations to the originator thereof; and marking further comprises marking as a neighbor an originator of an acknowledgement of a match between an interference pattern observed on a radio interface and an interference pattern broadcast on the interface between base stations.

18. The apparatus according to claim 17, wherein:

initiating further comprises initiating using the interface between base stations the broadcast distribution of the determined interference pattern by including information on the determined interference pattern in a high interference indication information element;

comparing further comprises initiating sending acknowledgement on a match between an interference pattern observed on a radio interface and an interference pattern broadcast on the interface between base stations to the originator thereof by including information on the match in an interference overload indication information element; and marking further comprises assessing a physical distance in a communication network configuration to the originator of the acknowledgement of a match between an interference pattern observed on a radio interface and an interference pattern broadcast on the interface between base stations based on an interference level indicated in the interference overload indication information element.

19. The apparatus according to claim 16, wherein:

the at least one memory and the computer program code are further configured to, with the at least one processor, cause the apparatus to perform at least the following:

detect communication network elements based on a internet protocol connection using the interface between base stations and to classify detected communication network elements according to an assessed physical distance in a communication network configuration based on a communication time evaluation:

initiating further comprises initiating using the interface between base stations the broadcast distribution of the determined interference pattern only with respect to a group of detected communication network elements which are classified to have a closest assessed physical distance.

20. The apparatus according to claim 16, wherein:
marking further comprises informing a neighbor marking to a concerned neighbor or another neighbor, and marking as a neighbor an originator of a neighbor marking information or another communication network element indicated in the neighbor marking information, as well as acknowledging receipt of a neighbor marking information.

* * * * *